United States Patent
Zhang et al.

(10) Patent No.: US 9,357,558 B2
(45) Date of Patent: May 31, 2016

(54) PARTITION SCHEDULING BASED ON BEAMTRACKING

(71) Applicant: QUALCOMM Incorporated, San Diego, CA (US)

(72) Inventors: Zhenliang Zhang, Somerset, NJ (US); Sundar Subramanian, Bridgewater, NJ (US); Ashwin Sampath, Skillman, NJ (US); Junyi Li, Chester, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 98 days.

(21) Appl. No.: 14/318,431

(22) Filed: Jun. 27, 2014

(65) Prior Publication Data
US 2015/0382370 A1    Dec. 31, 2015

(51) Int. Cl.
H04W 72/00 (2009.01)
H04W 72/12 (2009.01)
H04L 1/18 (2006.01)
H04W 24/08 (2009.01)
H04B 7/06 (2006.01)
H04W 72/02 (2009.01)
H04W 28/06 (2009.01)

(52) U.S. Cl.
CPC ............. *H04W 72/12* (2013.01); *H04B 7/0617* (2013.01); *H04B 7/0623* (2013.01); *H04L 1/1858* (2013.01); *H04W 24/08* (2013.01); *H04W 72/02* (2013.01); *H04W 28/06* (2013.01)

(58) Field of Classification Search
CPC ..... H04W 72/12; H04W 24/08; H04L 1/1858
USPC ........................................................ 455/450
See application file for complete search history.

(56) References Cited

U.S. PATENT DOCUMENTS

| | | | |
|---|---|---|---|
| 7,881,258 B2 | 2/2011 | Gilbert et al. | |
| 8,054,223 B2 | 11/2011 | Lakkis | |
| 8,432,938 B2 | 4/2013 | Singh et al. | |
| 8,457,026 B1 | 6/2013 | Ho et al. | |
| 8,654,880 B2 * | 2/2014 | Zhou ................... | H03M 13/255 375/259 |
| 2010/0164805 A1 | 7/2010 | Niu et al. | |
| 2011/0287796 A1 | 11/2011 | Jain et al. | |
| 2014/0051351 A1 | 2/2014 | Jia | |
| 2015/0289147 A1* | 10/2015 | Lou ....................... | H04B 7/0408 370/329 |

FOREIGN PATENT DOCUMENTS

WO       2010052519 A1      5/2010

OTHER PUBLICATIONS

International Search Report and Written Opinion—PCT/US2015/035249—ISA/EPO—Sep. 28, 2015.

* cited by examiner

*Primary Examiner* — Amancio Gonzalez
(74) *Attorney, Agent, or Firm* — Arent Fox LLP

(57) ABSTRACT

A method, an apparatus, and a computer program product for wireless communication are provided. The apparatus determines a first set of channels for communicating with another apparatus. Each channel in the first set is determined by performing beam training with the other apparatus. The apparatus further determines a second set of channels from the first set, wherein the channels of the second set have a channel condition greater than a threshold. The apparatus communicates data via the second set, wherein a channel of the second set on which the data is communicated is based on the channel condition of at least one channel of the second set.

30 Claims, 12 Drawing Sheets

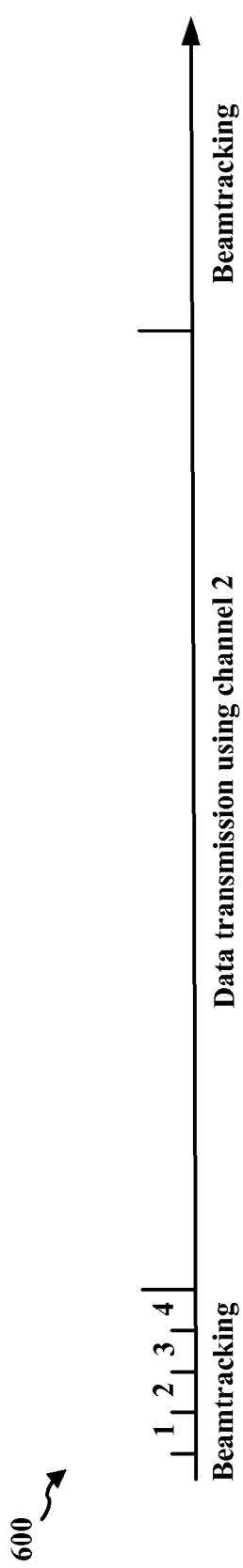
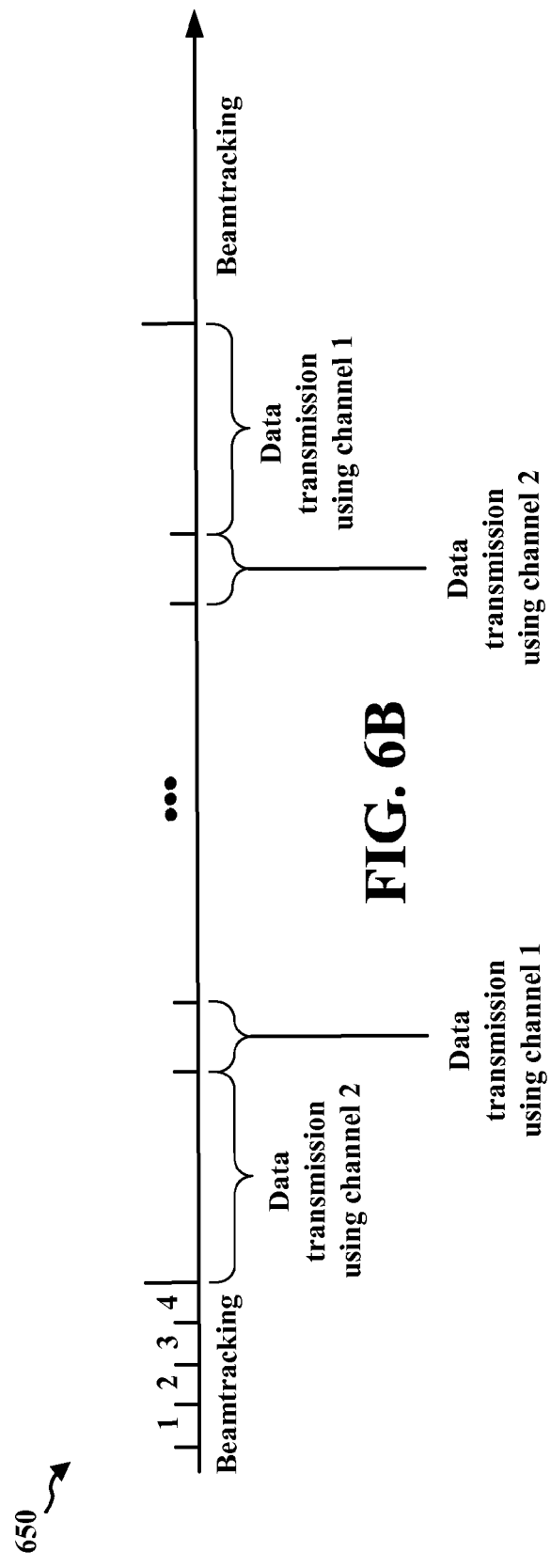

US 9,357,558 B2

PARTITION SCHEDULING BASED ON BEAMTRACKING

BACKGROUND

1. Field

The present disclosure relates generally to communication systems, and more particularly, to adaptively adjusting a period for scheduling beams along multiple directions based on corresponding channel conditions.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus for wireless communication are provided. The apparatus determines a first set of channels for communicating with another apparatus. Each channel in the first set is determined by performing beam training with the other apparatus. The apparatus further determines a second set of channels from the first set, wherein the channels of the second set have a channel condition greater than a threshold. The apparatus communicates data via the second set, wherein a channel of the second set on which the data is communicated is based on the channel condition of at least one channel of the second set.

BRIEF DESCRIPTION OF THE DRAWINGS

FIG. 6A is a diagram illustrating traditional beamtracking.

FIG. 6B is a diagram illustrating an example of adaptively adjusting the partitioning of a data transmission period.

DETAILED DESCRIPTION

Figure 1:
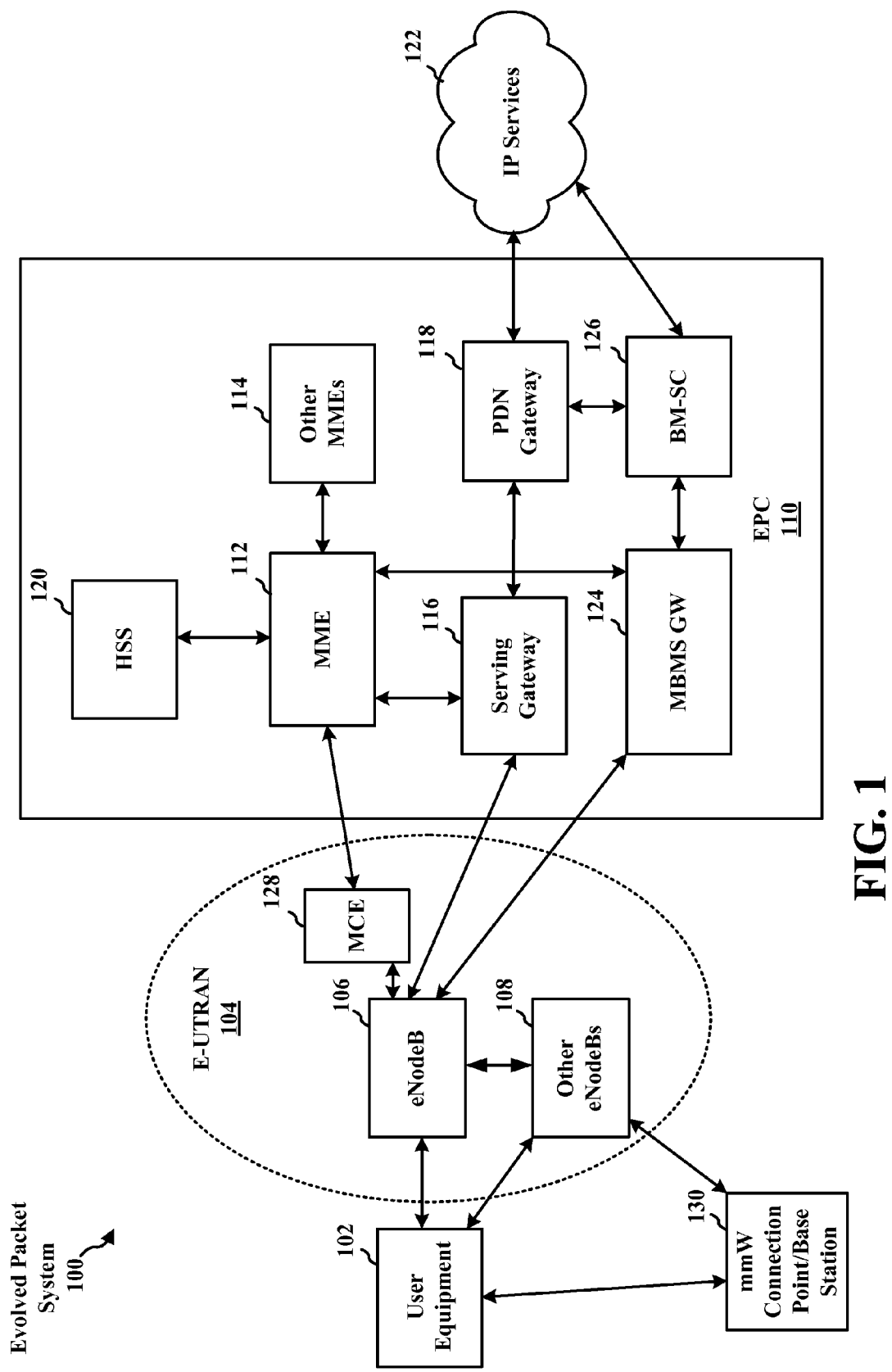
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating a network architecture (e.g., LTE network architecture) 100. The network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

In an aspect, the UE 102 is capable of communicating signals via the LTE network and a millimeter wave (mmW) system. Accordingly, the UE 102 may communicate with the eNB 106 and/or the other eNBs 108 over a LTE link. Additionally, the UE 102 may communicate with a connection point (CP) or base station (BS) 130 (capable of mmW system communication) over a mmW link.

In a further aspect, at least one of the other eNBs 108 may be capable of communicating signals via the LTE network and the mmW system. As such, an eNB 108 may be referred to as a LTE+mmW eNB. In another aspect, the CP/BS 130 may be capable of communicating signals via the LTE network and the mmW system. As such, the CP/BS 130 may be referred to as a LTE+mmW CP/BS. The UE 102 may communicate with the other eNB 108 over a LTE link as well as over a mmW link.

In yet another aspect, the other eNB 108 may be capable of communicating signals via the LTE network and the mmW system, while the CP/BS 130 is capable of communicating signals via the mmW system only. Accordingly, the CP/BS 130 unable to signal the other eNB 108 via the LTE network may communicate with the other eNB 108 over a mmW backhaul link. Discovery techniques in a directional wireless network such as EPS 100 between a UE 102 and CP 130 is discussed in further detail infra.

Figure 2:
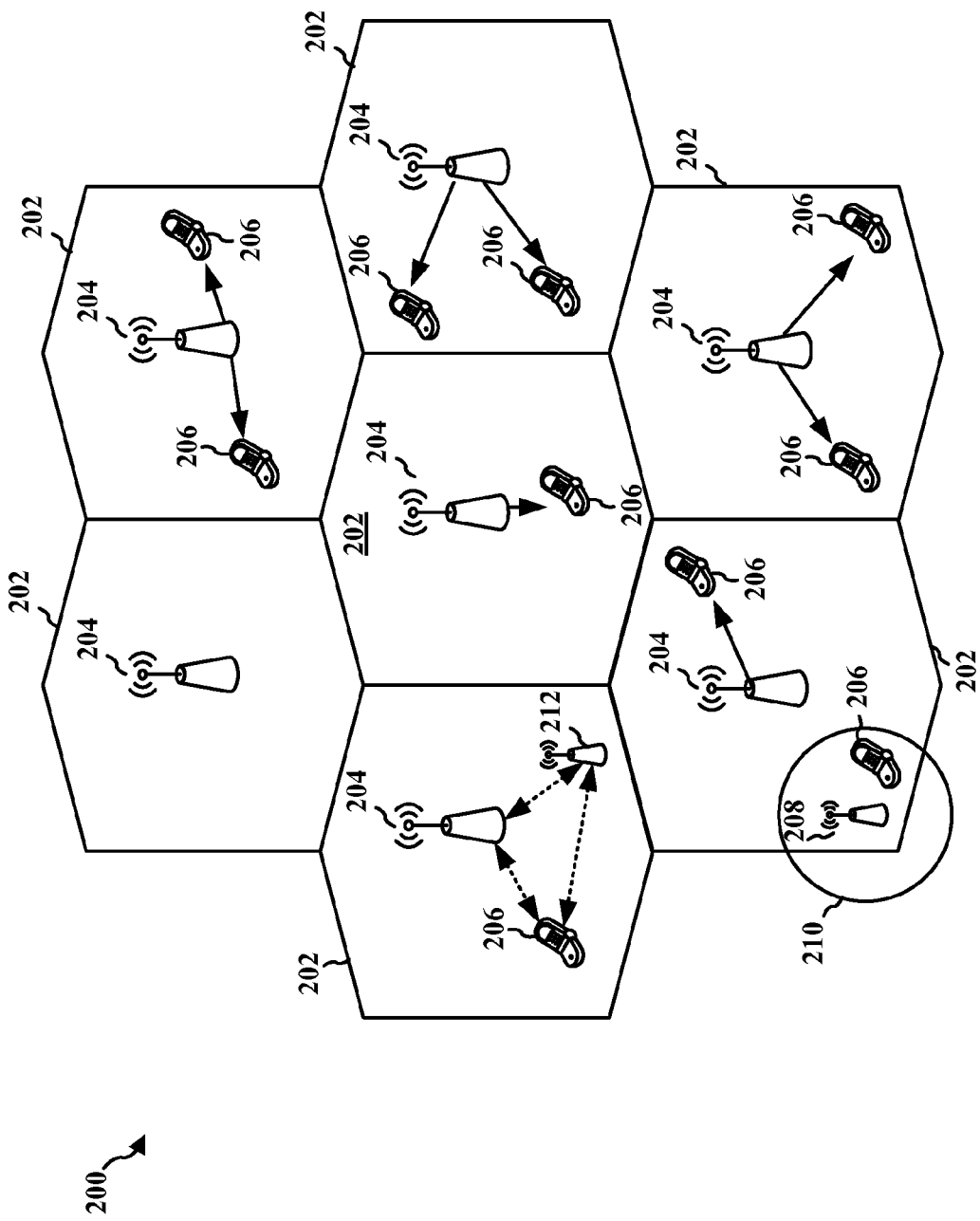
FIG. 2 is a diagram illustrating an example of an access network.

FIG. 2 is a diagram illustrating an example of an access network 200 in a network architecture (e.g., LTE network architecture). In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

In an aspect, the UE 206 may communicate signals via the LTE network and a millimeter wave (mmW) system. Accordingly, the UE 206 may communicate with the eNB 204 over a LTE link and communicate with a connection point (CP) or base station (BS) 212 (capable of mmW system communication) over a mmW link. In a further aspect, the eNB 204 and the CP/BS 212 may communicate signals via the LTE network and the mmW system. As such, the UE 206 may communicate with the eNB 204 over a LTE link and a mmW link (when the eNB 204 is capable of mmW system communication), or communicate with the CP/BS 212 over a mmW link and a LTE link (when the CP/BS 212 is capable of LTE network communication). In yet another aspect, the eNB 204 communicates signals via the LTE network and the mmW system, while the CP/BS 212 communicates signals via the mmW system only. Accordingly, the CP/BS 212 unable to signal the eNB 204 via the LTE network may communicate with the eNB 204 over a mmW backhaul link.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
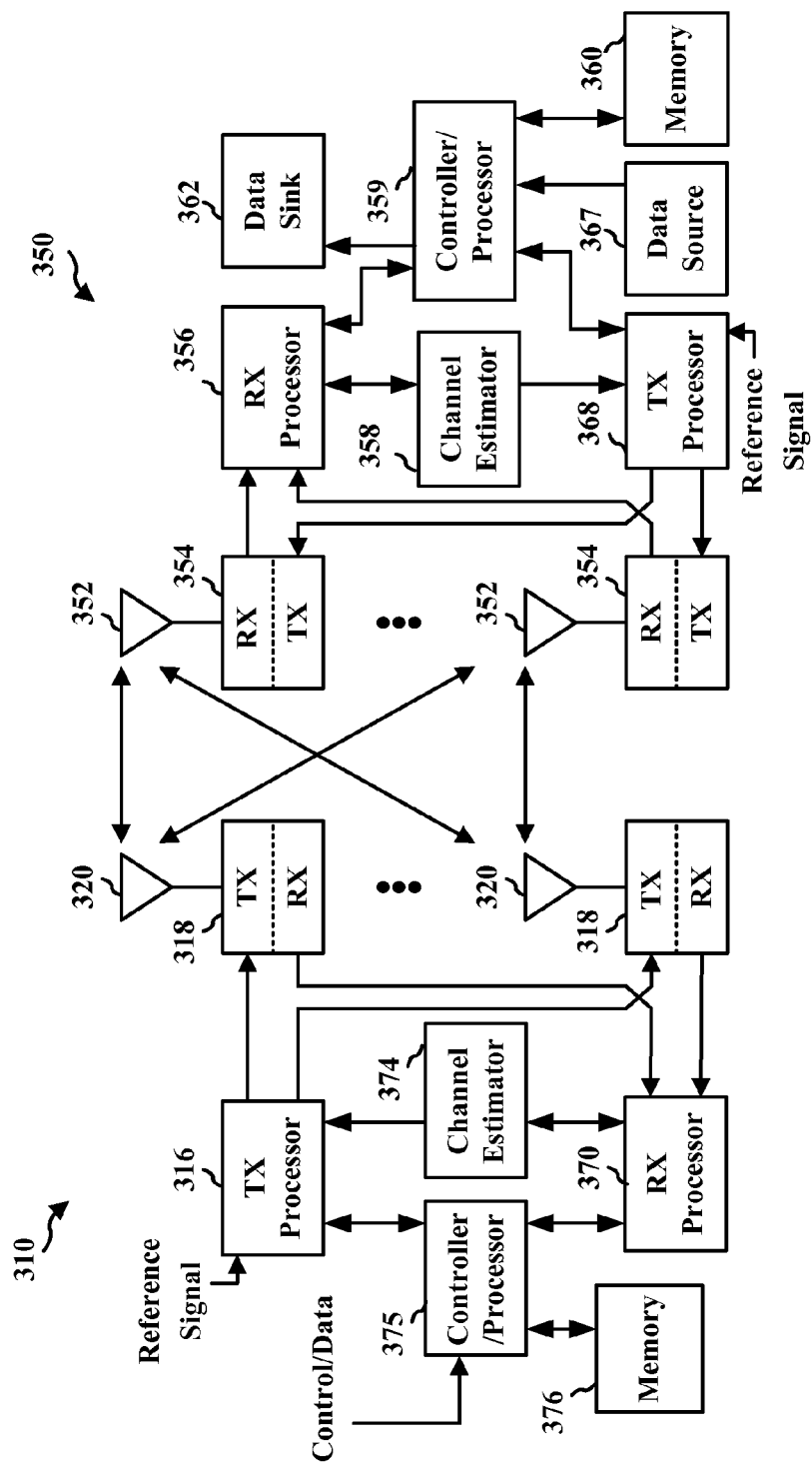
FIG. 3 is a diagram illustrating an example of an evolved Node B and user equipment in an access network.

FIG. 3 is a block diagram of a base station 310 in communication with a UE 350 in an access network. The base station 310 may be, for example, an eNB of a LTE system, a connection point (CP)/access point/base station of a millimeter wave (mmW) system, an eNB capable of communicating signals via the LTE system and the mmW system, or a connection point (CP)/access point/base station capable of communicating signals via the LTE system and the mmW system. The UE 350 may be capable of communicating signals via the LTE system and/or the mmW system. In the DL, upper layer packets from the core network are provided to a controller/processor 375. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions. The signal processing functions include coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362. Various control signals may also be provided to the data sink 362 for processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. Similar to the functionality described in connection with the DL transmission by the base station 310, the controller/processor 359 provides header compression, ciphering, packet segmentation and reordering, and multiplexing between logical and transport channels based on radio resource allocations by the base station 310. The controller/processor 359 is also responsible for HARQ operations, retransmission of lost packets, and signaling to the base station 310.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the control/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

A motivation for LTE is to increase a cellular network bandwidth for a mobile data demand. As the mobile data demand increases, various other technologies may be utilized to sustain the demand. For example, high speed mobile data may be delivered using a millimeter wave (mmW) channel.

A mmW link may be defined as the delivery of baseband symbols from a transmitter capable of mmW beamforming to a receiver capable of mmW beamforming. A mmW resource unit may include a specific combination of a beam width, a beam direction, and a timeslot. The timeslot may be a fraction of a LTE subframe and aligned with a LTE physical downlink control channel (PDCCH) frame timing. To effectively increase a receive mmW signal strength without increasing transmission power at the transmitter, beamforming may be applied. A receiver gain may be increased by reducing the mmW beam width of either, or both, the transmitter and the receiver. For example, the beam width may be changed by applying phase shifting to an antenna array.

A mmW communication system may operate at very high frequency bands (e.g., 10 GHz to 300 GHz). Such high carrier frequencies allow for the use of large bandwidth. For example, a 60 GHz mmW wireless network provides large bandwidth at approximately a 60 GHz frequency band and has the ability to support a very high data rate (e.g., up to 6.7 Gbps). The very high frequency bands may be used for backhaul communications or for network access (e.g., UEs accessing a network), for example. Applications supported by the mmW system may include uncompressed video streaming, sync-n-go file transfer, video games, and projections to wireless displays, for example.

A mmW system may operate with the help of a number of antennas and beamforming to overcome a channel having low gain. For example, heavy attenuation at high carrier frequency bands may limit a range of a transmitted signal to a few meters (e.g., 1 to 3 meters). Also, the presence of obstacles (e.g., walls, furniture, human beings, etc.) may block the propagation of a high frequency millimeter wave. As such, propagation characteristics at the high carrier frequencies necessitate the need for beamforming to overcome the loss. Beamforming may be implemented via an array of antennas (e.g., phased arrays) cooperating to beamform a high frequency signal in a particular direction to receiving devices, and therefore, extend the range of the signal. While the mmW system may operate in a stand-alone fashion, the mmW system may be implemented in conjunction with more established but lower frequency (and lower bandwidth) systems, such as LTE.

In an aspect, the present disclosure provides for cooperative techniques between the LTE system and the mmW system. For example, the present disclosure may exploit the presence of a more robust system to help with beamforming, synchronization, or discovery of a base station. Cooperation between the mmW system and a lower-frequency system (e.g., LTE) may be facilitated by the following: 1) Types of signaling in support of discovery, synchronization, or association on a mmW channel can be sent over a different lower-frequency robust carrier; 2) Order of sending discovery and synchronization signaling between a mmW channel and a lower-frequency carrier (e.g., LTE); 3) Exploitation of existing connectivity; 4) Information to be included by base stations (BSs)/user equipments (UEs) in a transmitted message; and 5) Information to be included in LTE signaling.

In an aspect, mmW-capable connection points (CPs) or base stations (BSs) (network access points for mmW-capable devices) may be mounted on light poles, building sides, and/ or collocated with metro cells. A mmW link may be formed by beamforming along a line of sight (LOS) or dominant reflected paths or diffracted paths around obstacles. A challenge of a mmW-capable device is to find an appropriate LOS or reflected path for beamforming.

Figure 4A:
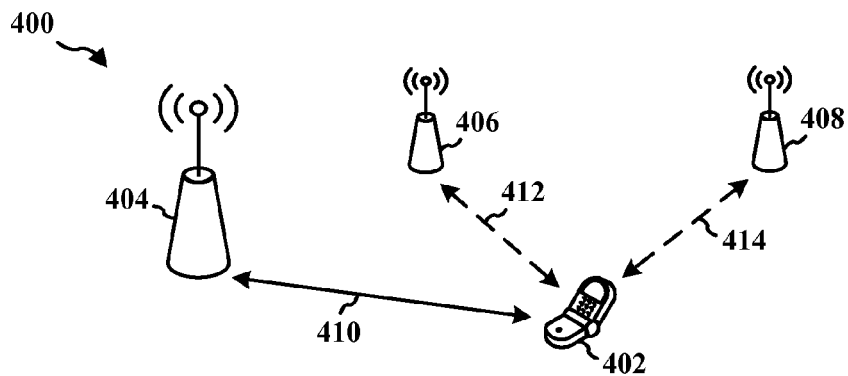
FIGS. 4A to 4C are diagrams illustrating example deployments of a mmW system used in conjunction with a LTE system.
Figure 4B:
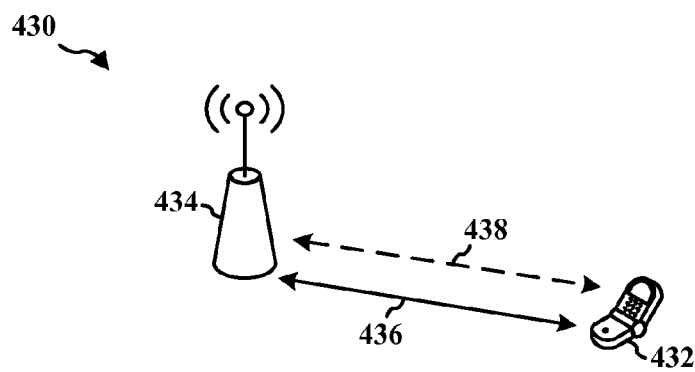
Figure 4C:
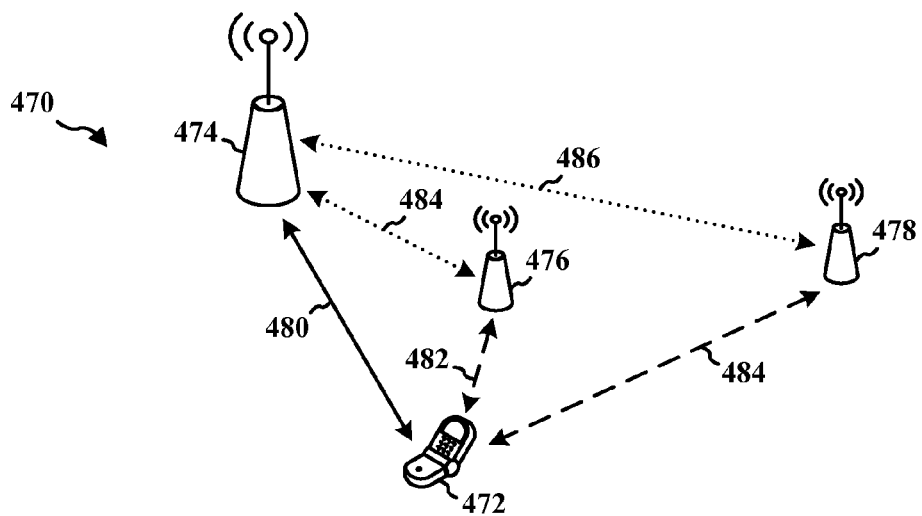

FIGS. 4A to 4C are diagrams illustrating example deployments of a mmW system used in conjunction with a LTE system. In FIG. 4A, diagram 400 illustrates a deployment where a LTE system operates independently of, and in parallel with, a mmW system. As shown in FIG. 4A, a UE 402 is capable of communicating signals via a LTE system and a mmW system. Accordingly, the UE 402 may communicate with a eNB 404 over a LTE link 410. In parallel with the LTE link 410, the UE 402 may also communicate with a first BS 406 over a first mmW link 412 and communicate with a second BS 408 over a second mmW link 414.

In FIG. 4B, diagram 430 illustrates a deployment where the LTE system and the mmW system are collocated. As shown in FIG. 4B, a UE 432 is capable of communicating signals via the LTE system and the mmW system. In an aspect, a BS 434 may be an LTE eNB capable of communicating signals via the LTE system and the mmW system. As such, the BS 434 may be referred to as a LTE+mmW eNB. In another aspect, the BS 434 may be a mmW CP capable of communicating signals via the LTE system and the mmW system. As such, the BS 434 may be referred to as a LTE+mmW BS. The UE 432 may communicate with the BS 434 over a LTE link 436. Meanwhile, the UE 432 may also communicate with the BS 434 over a mmW link 438.

In FIG. 4C, diagram 470 illustrates a deployment where a BS capable of communicating signals via the LTE system and the mmW system (LTE+mmW base station) is present with BSs capable of communicating signals via the mmW system only. As shown in FIG. 4C, a UE 472 may communicate with a LTE+mmW BS 474 over a LTE link 480. The LTE+mmW BS 474 may be a LTE+mmW eNB. In parallel with the LTE link 480, the UE 472 may also communicate with a second BS 476 over a first mmW link 482 and communicate with a third BS 478 over a second mmW link 484. The second BS 476 may further communicate with the LTE+mmW BS 474 over a first mmW backhaul link 484. The third BS 478 may further communicate with the LTE+mmW BS 474 over a second mmW backhaul link 486.

Figure 5A:
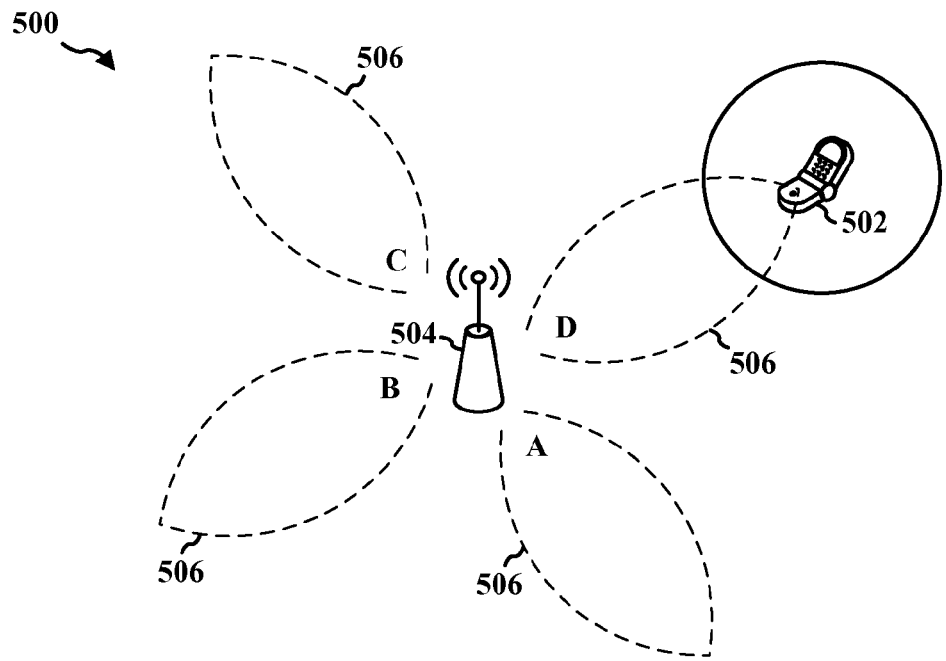
FIGS. 5A and 5B are diagrams illustrating an example of the transmission of beamformed signals between a connection point and a UE.
Figure 5B:
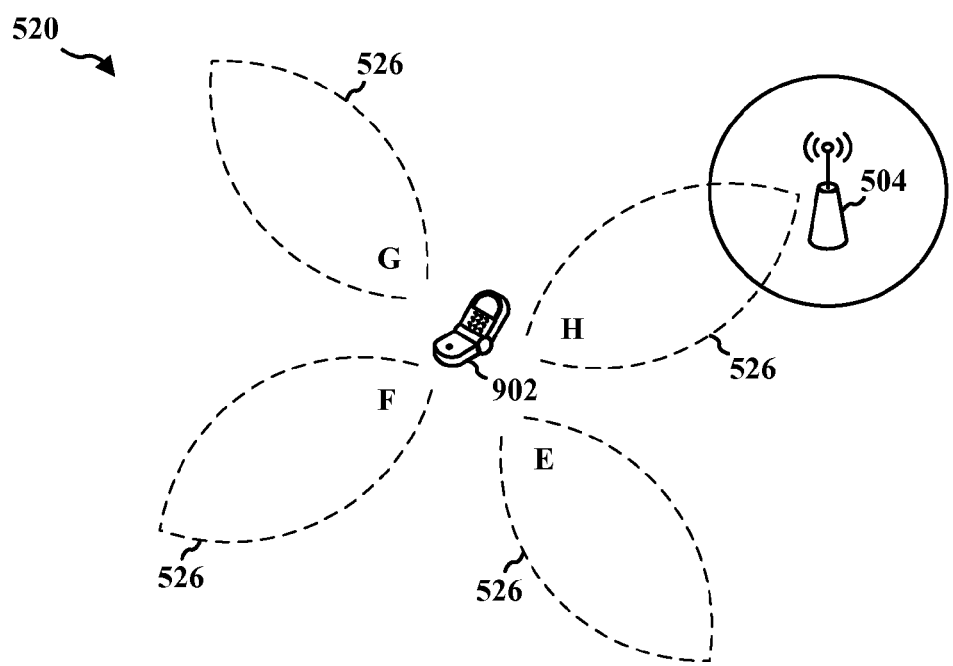

FIGS. 5A and 5B are diagrams illustrating an example of the transmission of beamformed signals between a CP and a UE. The CP may be embodied as a BS in a mmW system (mmW BS). Referring to FIG. 5A, diagram 500 illustrates a CP 504 of a mmW system transmitting beamformed signals 506 (e.g., synchronization signals or discovery signals) in different transmit directions (e.g., directions A, B, C, and D). In an example, the CP 504 may sweep through the transmit directions according to a sequence A-B-C-D. In another example, the CP 504 may sweep through the transmit directions according to the sequence B-D-A-C. Although only four transmit directions and two transmit sequences are described with respect to FIG. 5A, any number of different transmit directions and transmit sequences are contemplated.

After transmitting the signals, the CP 504 may switch to a receive mode. In the receive mode, the CP 504 may sweep through different receive directions in a sequence or pattern corresponding (mapping) to a sequence or pattern in which the CP 504 previously transmitted the synchronization/discovery signals in the different transmit directions. For example, if the CP 504 previously transmitted the synchronization/discovery signals in transmit directions according to the sequence A-B-C-D, then the CP 504 may sweep through receive directions according to the sequence A-B-C-D in an attempt to receive an association signal from a UE 502. In another example, if the CP 504 previously transmitted the synchronization/discovery signals in transmit directions according to the sequence B-D-A-C, then the CP 504 may sweep through receive directions according to the sequence B-D-A-C in an attempt to receive the association signal from the UE 502.

A propagation delay on each beamformed signal allows a UE 502 to perform a receive (RX) sweep. The UE 502 in a receive mode may sweep through different receive directions in an attempt to detect a synchronization/discovery signal 506 (see FIG. 5B). One or more of the synchronization/discovery signals 506 may be detected by the UE 502. When a strong synchronization/discovery signal 506 is detected, the UE 502 may determine an optimal transmit direction of the CP 504 and an optimal receive direction of the UE 502 corresponding to the strong synchronization/discovery signal. For example, the UE 502 may determine preliminary antenna weights/ directions of the strong synchronization/discovery signal 506, and may further determine a time and/or resource where the CP 504 is expected to optimally receive a beamformed signal. Thereafter, the UE 502 may attempt to associate with the CP 504 via a beamformed signal.

Referring to diagram 520 of FIG. 5B, the UE 502 may listen for beamformed discovery signals in different receive directions (e.g., directions E, F, G, and H). In an example, the UE 502 may sweep through the receive directions according to a sequence E-F-G-H. In another example, the UE 502 may sweep through the receive directions according to the sequence F-H-E-J. Although only four receive directions and two receive sequences are described with respect to FIG. 5B, any number of different receive directions and receive sequences are contemplated.

The UE 502 may attempt the association by transmitting beamformed signals 526 (e.g., association signals) in the different transmit directions (e.g., directions E, F, G, and H). In an aspect, the UE 502 may transmit an association signal 526 by transmitting along the optimal receive direction of the UE 502 at the time/resource where the CP 504 is expected to optimally receive the association signal. The CP 504 in the receive mode may sweep through different receive directions and detect the association signal 526 from the UE 502 during one or more timeslots corresponding to a receive direction. When a strong association signal 526 is detected, the CP 504 may determine an optimal transmit direction of the UE 502 and an optimal receive direction of the CP 504 corresponding to the strong association signal. For example, the CP 504 may determine preliminary antenna weights/directions of the strong association signal 526, and may further determine a time and/or resource where the UE 502 is expected to optimally receive a beamformed signal. Any of the processes discussed above with respect to FIGS. 5A and 5B may be refined or repeated over time such that the UE 502 and CP 504 eventually learn the most optimal transmit and receive directions for establishing a link with each other. Such refinement and repetition may be referred to as beam training.

In an aspect, the CP 504 may choose a sequence or pattern for transmitting the synchronization/discovery signals according to a number of beamforming directions. The CP 504 may then transmit the signals for an amount of time long enough for the UE 502 to sweep through a number of beamforming directions in an attempt to detect a synchronization/ discovery signal. For example, a CP beamforming direction may be denoted by n, where n is an integer from 0 to N, N being a maximum number of transmit directions. Moreover, a UE beamforming direction may be denoted by k, where k is an integer from 0 to K, K being a maximum number of receive directions. When the UE 502 detects a synchronization/discovery signal from the CP 504, the UE 502 may discover that the strongest synchronization/discovery signal is received when the UE 502 beamforming direction is k=2 and the CP 504 beamforming direction is n=3. Accordingly, the UE 502 may use the same antenna weights/directions for responding (transmitting a beamformed signal) to the CP 504 in a corresponding response timeslot. That is, the UE 502 may send a signal to the CP 504 using UE 502 beamforming direction k=2 during a timeslot when the CP 504 is expected to perform a receive sweep at CP 504 beamforming direction n=3.

In an aspect, the present disclosure provides for adaptively adjusting a partition for scheduling beams along multiple directions based on corresponding channel conditions. Beamtracking may be used for beamforming training during data transmission to accommodate channel variation.

FIG. 6A is a diagram 600 illustrating traditional beamtracking. Traditional beamtracking may be performed after data transmission has occurred for a certain amount of time since channel conditions may have changed during the elapsed time. As a result of the beamtracking, a favorable channel may be discovered and data may be transmitted via the favorable channel. An example of traditional beamtracking is shown in FIG. 6A. In FIG. 6A, a transmit (TX) antenna may send beamtracking signals along a number of directions, e.g., channels 1, 2, 3, and 4. If channel 2 has a best channel condition, then data may be transmitted using channel 2 until a next round of beamtracking is necessary (e.g., when the channel condition of channel 2 deteriorates). In general, beamtracking takes less time than data transmission at the cost of a slight increase in overhead. However, a channel condition may vary noticeably during data transmission. For example, in FIG. 6A, channel 2 may deteriorate quickly, thus making data transmission on channel 2 inefficient. The inefficiency of transmitting data on a deteriorated channel may be partially resolved by performing beamtracking more frequently. However, increasing the frequency of beamtracking may not be reasonable since beamtracking increases overhead, and system efficiency may be better suited by maintaining a small overhead.

In an aspect, the present disclosure provides a partition scheduling scheme based on beamtracking that is more robust against channel variation without increasing an overhead size. For example, after initial beamforming training, a transmitter may determine several favorable channels and corresponding beam directions for sending signals. The transmitter may track conditions of the favorable channels by performing beamtracking periodically. In an aspect of the present disclosure, the transmitter may not transmit data only over a best channel resulting from a beamtracking outcome, but may transmit the data over a number of high-quality (channel condition) channels resulting from the beamtracking outcome.

In an aspect, an adaptive partition scheduling scheme may be provided as follows. Based on a beamtracking outcome, a transmitter may determine the existence of a number of reasonably good (e.g., high-quality) candidate channels. Accordingly, a subsequent short data transmission period may be divided into proportional fractions based on the channel conditions of the candidate channels. Within each fraction, data may be transmitted along one of the candidate channels.

After each round of beamtracking, the conditions of the candidate channels may be reevaluated based on feedback from a receiver. The feedback may include a signal-to-noise ratio (SNR), a bit-error rate, etc. Accordingly, the fractions of the data transmission period corresponding to the respective candidate channels may be adaptively adjusted based on the feedback received for each candidate channel. An example of this process is shown in FIG. 6B.

FIG. 6B is a diagram 650 illustrating an example of adaptively adjusting the partitioning of a data transmission period. In FIG. 6B, a transmitter may send signals to track the conditions of a number of channels, e.g., channels 1, 2, 3, and 4. As a result, channels 1 and 2 may be reasonably good (e.g., have high-quality) in terms of a channel condition metric, and therefore, chosen as candidate channels. Thereafter, a subsequent small data transmission period may be divided into proportional fractions based on the channel conditions of the two candidate channels. Within each fraction, the transmitter may transmit data along one of the two candidate channels. In an example, the condition of channel 2 may be higher in quality than the condition of channel 1. Therefore, the data transmission period may be divided amongst the channels 1 and 2 according to the level of quality on each channel. Hence, because channel 2 is the higher-quality channel, the data may be transmitted over channel 2 for a longer period of time than channel 1.

In an aspect, the operation described with respect to FIG. 6B may provide a reasonable data transmission rate since the transmission may use a best available channel for most of the data transmission period. However, over a relatively long data transmission duration, the condition of channel 2 may deteriorate quickly while the condition of channel 1 may improve. Based on feedback from a receiver for the two candidate channels 1 and 2, the fractions of the data transmission period corresponding to the two candidate channels may be adjusted. Accordingly, at a later time, the transmitter may transmit the data mostly using channel 1 while keeping track of the channel condition of channel 2.

In an aspect, the number of candidate channels may depend on the outcome of beamtracking. For example, after beamtracking if the transmitter determines that four channels equally have a high-quality channel condition, then the transmitter may divide a short data transmission period into four equal fractions while keeping track of the conditions of all channels. If the number of candidate channels is initially large, then during data transmission, the transmitter may remove/reallocate any fractions corresponding to the channels that have significant channel condition deterioration.

As described above, the adaptive adjustment of a data transmission period partition is mainly discussed with respect to a transmitter. For example, the operations described above may be used for transmit (TX) antenna training However, the present disclosure also provides for adaptively adjusting a data reception period partition with respect to a receiver. In an example, for receive (RX) antenna training, RX-specific pilot tones may be added to data transmission symbols.

In an aspect of the present disclosure, a method of wireless communication may be as follows. The method may be performed by a UE. First, the UE may determine a first set of channels for communicating with a base station, wherein each channel in the first set has a corresponding beam direction. The first set of channels may be determined by performing beam training with the base station. Thereafter, the UE may track a channel condition of each channel in the first set by periodically performing beamtracking along the corresponding beam direction. The UE may determine a second set of candidate channels from the first set of channels, wherein each candidate channel in the second set has a channel condition above a threshold. The UE divides a data transmission period into a number of sub-periods corresponding to a number of candidate channels in the second set, and transmits data via the candidate channels. The data transmitted via a respective candidate channel is transmitted during a sub-period corresponding to the respective candidate channel.

In a further aspect, the method provides for the UE to size a length of the sub-period corresponding to the respective candidate channel based on the channel condition of the respective candidate channel. A sub-period having a largest length among the number of sub-periods corresponds to a candidate channel having a strongest channel condition among the number of candidate channels.

In another aspect, the method provides for the UE to receive from a receiver an updated channel condition of the respective candidate channel. The UE may then re-size the length of the sub-period corresponding to the respective candidate channel based on the updated channel condition of the respective candidate channel, and transmit the data via the respective candidate channel during the corresponding sub-period having the re-sized length. When the updated channel condition of the respective candidate channel is below the threshold, the UE may refrain from transmitting the data via the respective candidate channel.

Figure 7:
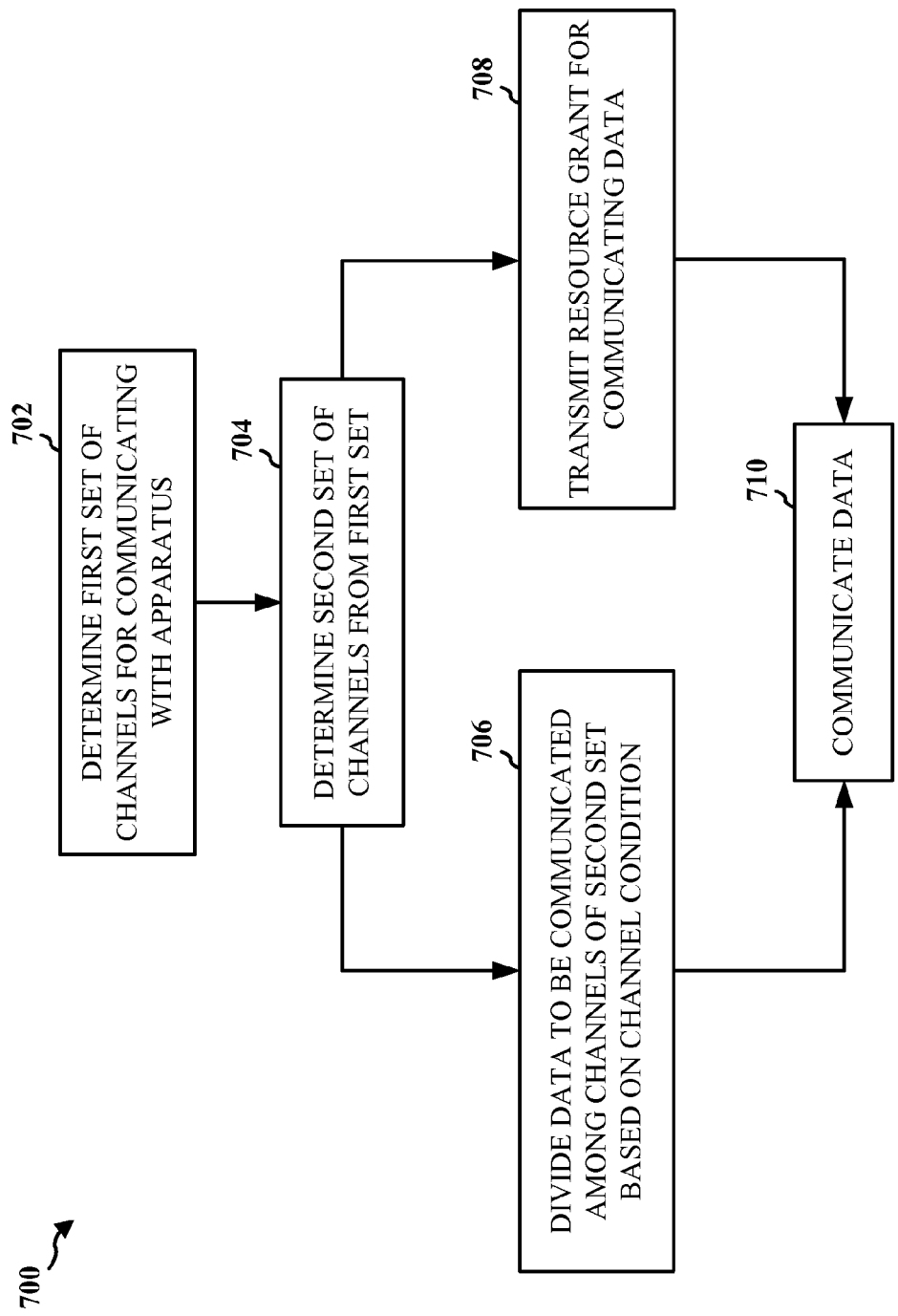
FIG. 7 is a flow chart of a method of wireless communication.

FIG. 7 is a flow chart 700 of a method of wireless communication. The method may be performed by a base station (e.g., CP 504). At step 702, the base station determines a first set of channels for communicating with an apparatus (e.g., UE 502). Each channel in the first set may be determined by performing beam training with the apparatus.

At step 704, the base station determines a second set of channels from the first set. The channels of the second set may have a channel condition greater than a threshold.

At step 710, the base station communicates data to the apparatus via the second set. A channel of the second set on which the data is communicated may be based on the channel condition of at least one channel of the second set. Moreover, the communication of data may include transmitting data to and/or receiving data from the apparatus.

In an aspect, when the base station is configured to transmit data to the apparatus in the downlink, the base station may determine the second set of channels (step 704) by first transmitting, to the apparatus, at least one pilot signal on each channel of the first set. Thereafter, the base station may monitor the channel condition of each channel of the first set based on receiving an acknowledgment (ACK)/negative acknowledgment (NACK) signal on one or more channels of the first set in response to the at least one pilot signal. The base station then determines the second set to include the channels of the first set having a monitored channel condition greater than the threshold. Accordingly, at step 706 (prior to communicating the data at step 710), the base station divides the data to be communicated among the channels of the second set based on the monitored channel condition of at least one channel of the second set (see FIG. 6B and corresponding description). The base station may further adjust a number of pilot signals transmitted on each channel of the second set based on the monitored channel condition of the at least one channel of the second set.

In a further aspect, when the base station is configured to receive data from the apparatus in the uplink, the base station may determine the second set of channels (step 704) by first monitoring the channel condition of each channel of the first set. Thereafter, the base station determines a resource grant for communicating the data (e.g., receiving the data) based on the monitored channel condition of each channel of the first set. The base station then determines the second set to include the channels of the first set corresponding to the determined resource grant. Accordingly, at step 708 (prior to communicating the data at step 710), the base station transmits, to the apparatus, the resource grant for receiving the data from the apparatus.

Figure 8:
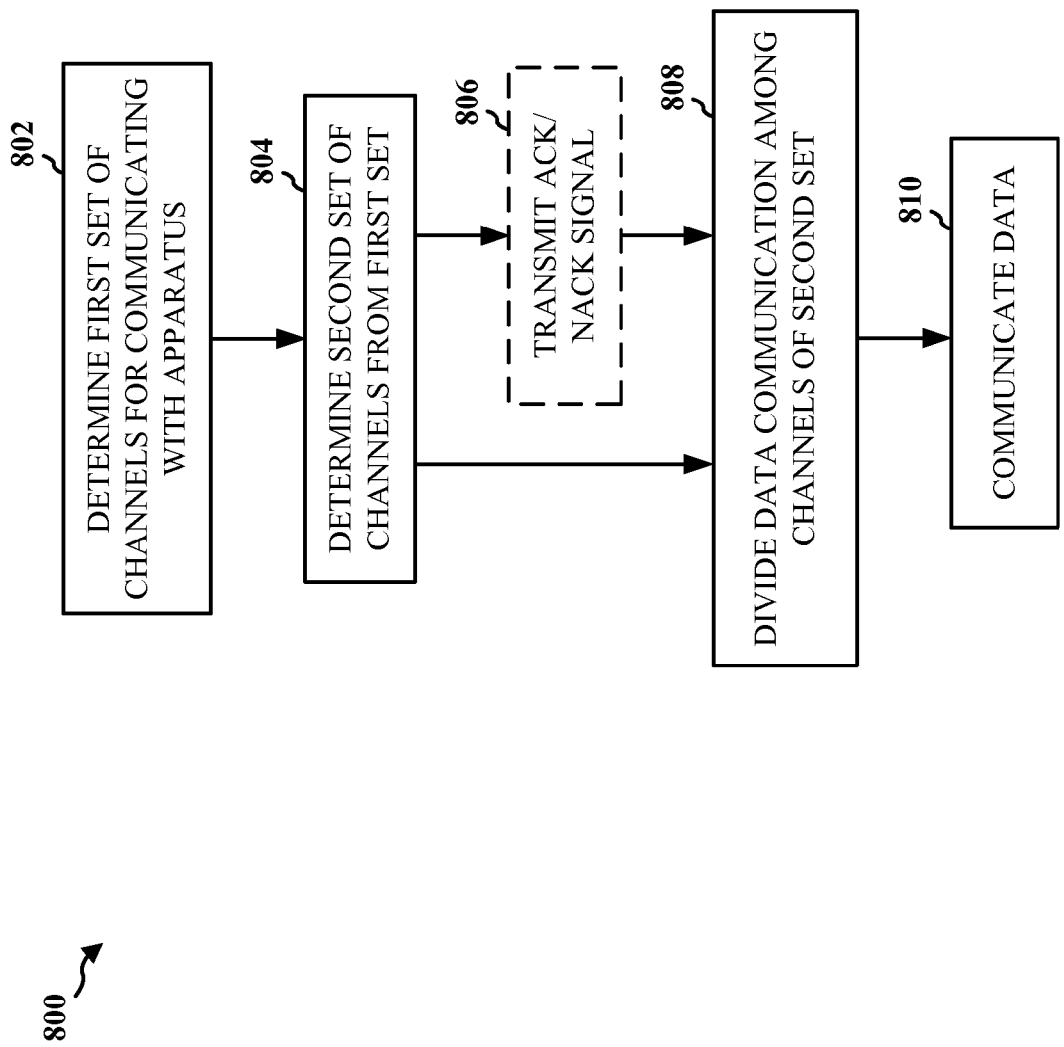
FIG. 8 is a flow chart of a method of wireless communication.

FIG. 8 is a flow chart 800 of a method of wireless communication. The method may be performed by a UE (e.g., UE 502). At step 802, the UE determines a first set of channels for communicating with an apparatus (e.g., CP 502). Each channel in the first set may be determined by performing beam training with the apparatus.

At step 804, the UE determines a second set of channels from the first set. The channels of the second set may have a channel condition greater than a threshold.

At step 810, the UE communicates data to the apparatus via the second set. A channel of the second set on which the data is communicated may be based on the channel condition of at least one channel of the second set. Moreover, the communication of data may include transmitting data to and/or receiving data from the apparatus.

In an aspect, when the UE is configured to receive data from the apparatus in the downlink, the UE may determine the second set of channels (step 804) by first monitoring the channel condition of each channel of the first set based on receiving, from the apparatus, at least one pilot signal on one or more channels of the first set. Thereafter, the UE determines the second set to include the one or more channels of the first set having a monitored channel condition greater than the threshold. Accordingly, at step 808 (prior to communicating the data at step 810), the UE divides communication of the data (e.g., reception of the data) among the channels of the second set based on the monitored channel condition of at least one channel of the second set. Additionally or alternatively, prior to dividing communication of the data (step 808), the UE may transmit, to the apparatus, an acknowledgment (ACK)/negative acknowledgment (NACK) signal on the one or more channels included in the second set in response to the at least one pilot signal.

In another aspect, when the UE is configured to transmit data to the apparatus in the uplink, the UE may determine the second set of channels (step 804) by first receiving, from the apparatus, a resource grant for communicating the data to the apparatus. The UE may then determine the second set to include the channels of the first set corresponding to the resource grant. Accordingly, at step 808 (prior to communicating the data at step 810), the UE divides communication of the data (e.g., transmission of the data) among the channels of the second set based on the resource grant.

Figure 9:
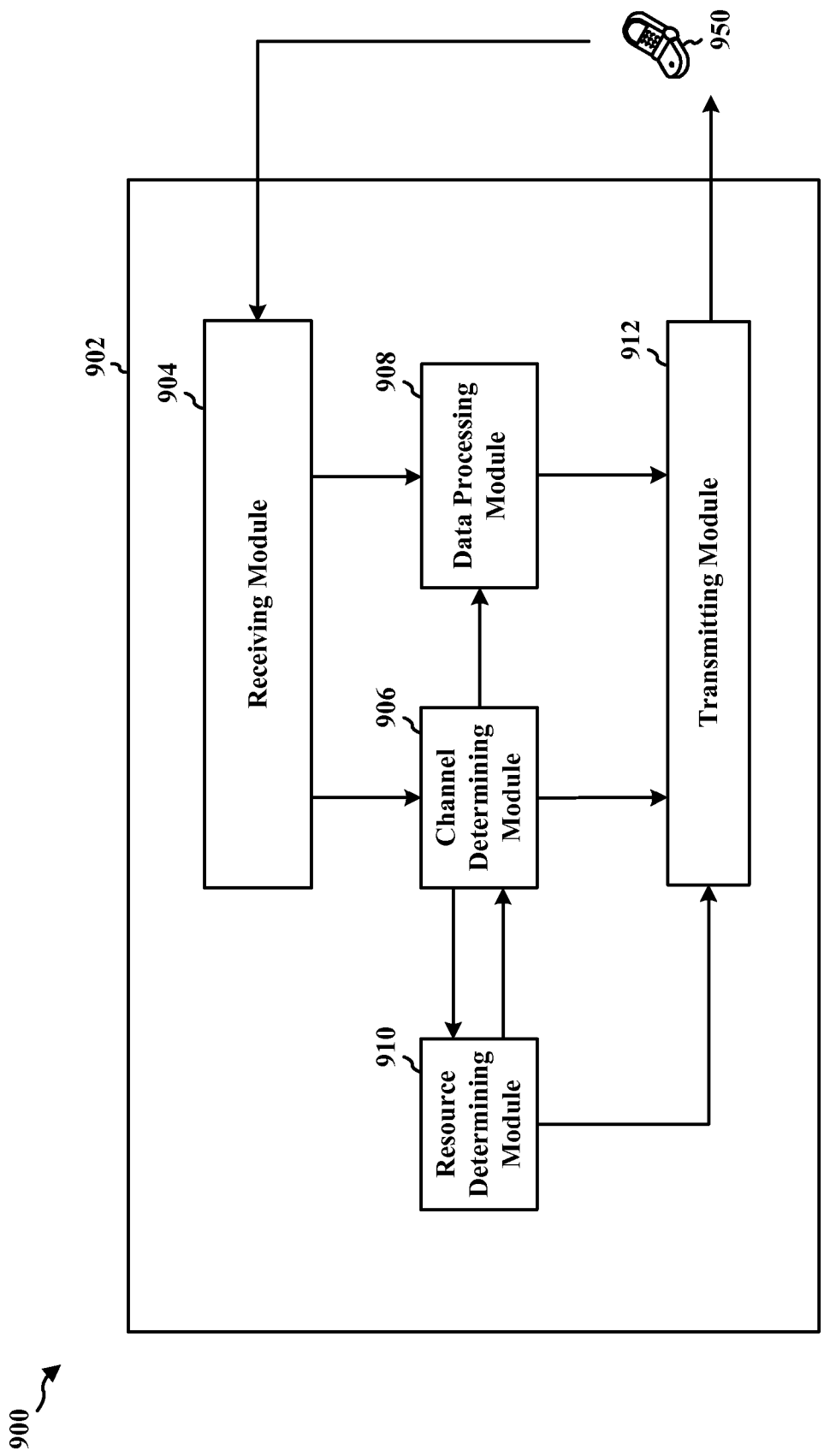
FIG. 9 is a data flow diagram illustrating the data flow between different modules/means/components in an exemplary apparatus.

FIG. 9 is a conceptual data flow diagram 900 illustrating the data flow between different modules/means/components in an exemplary apparatus 902. The apparatus may be a base station (e.g., CP 504). The apparatus includes a receiving module 904, a channel determining module 906, a data processing module 908, a resource determining module 910, and a transmitting module 912.

The channel determining module 906 determines a first set of channels for communicating with a UE 950 (e.g., UE 502). Each channel in the first set may be determined by performing beam training with the UE 950.

The channel determining module 906 determines a second set of channels from the first set. The channels of the second set may have a channel condition greater than a threshold.

The data processing module 908 communicates data to the UE 950 via the second set. A channel of the second set on which the data is communicated may be based on the channel condition of at least one channel of the second set. Moreover, the communication of data may include transmitting (via the transmitting module 912) data to and/or receiving (via the receiving module 904) data from the UE 950.

In an aspect, when the apparatus 902 is configured to transmit data to the UE 950 in the downlink, the channel determining module 906 may determine the second set of channels by first transmitting (via the transmitting module 912) to the UE 950 at least one pilot signal on each channel of the first set. Thereafter, the channel determining module 906 may monitor the channel condition of each channel of the first set based on receiving an acknowledgment (ACK)/negative acknowledgment (NACK) signal on one or more channels of the first set in response to the at least one pilot signal. The channel determining module 906 then determines the second set to include the channels of the first set having a monitored channel condition greater than the threshold. Accordingly, prior to communicating the data, the data processing module 908 divides the data to be communicated among the channels of the second set based on the monitored channel condition of at least one channel of the second set. The channel determining module 906 may further adjust a number of pilot signals transmitted on each channel of the second set based on the monitored channel condition of the at least one channel of the second set.

In a further aspect, when the apparatus 902 is configured to receive data from the UE 950 in the uplink, the channel determining module 906 may determine the second set of channels by first monitoring the channel condition of each channel of the first set. Thereafter, the resource determining module 910 determines a resource grant for communicating the data (e.g., receiving the data) based on the monitored channel condition of each channel of the first set. The channel determining module 906 then determines the second set to include the channels of the first set corresponding to the determined resource grant. Accordingly, prior to the data processing module 908 receiving the data, the resource determining module 910 transmits (via the transmitting module 912) to the UE 950 the resource grant for receiving the data from the UE 950.

The apparatus may include additional modules that perform each of the steps of the algorithm in the aforementioned flow chart of FIG. 7. As such, each step in the aforementioned flow chart of FIG. 7 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
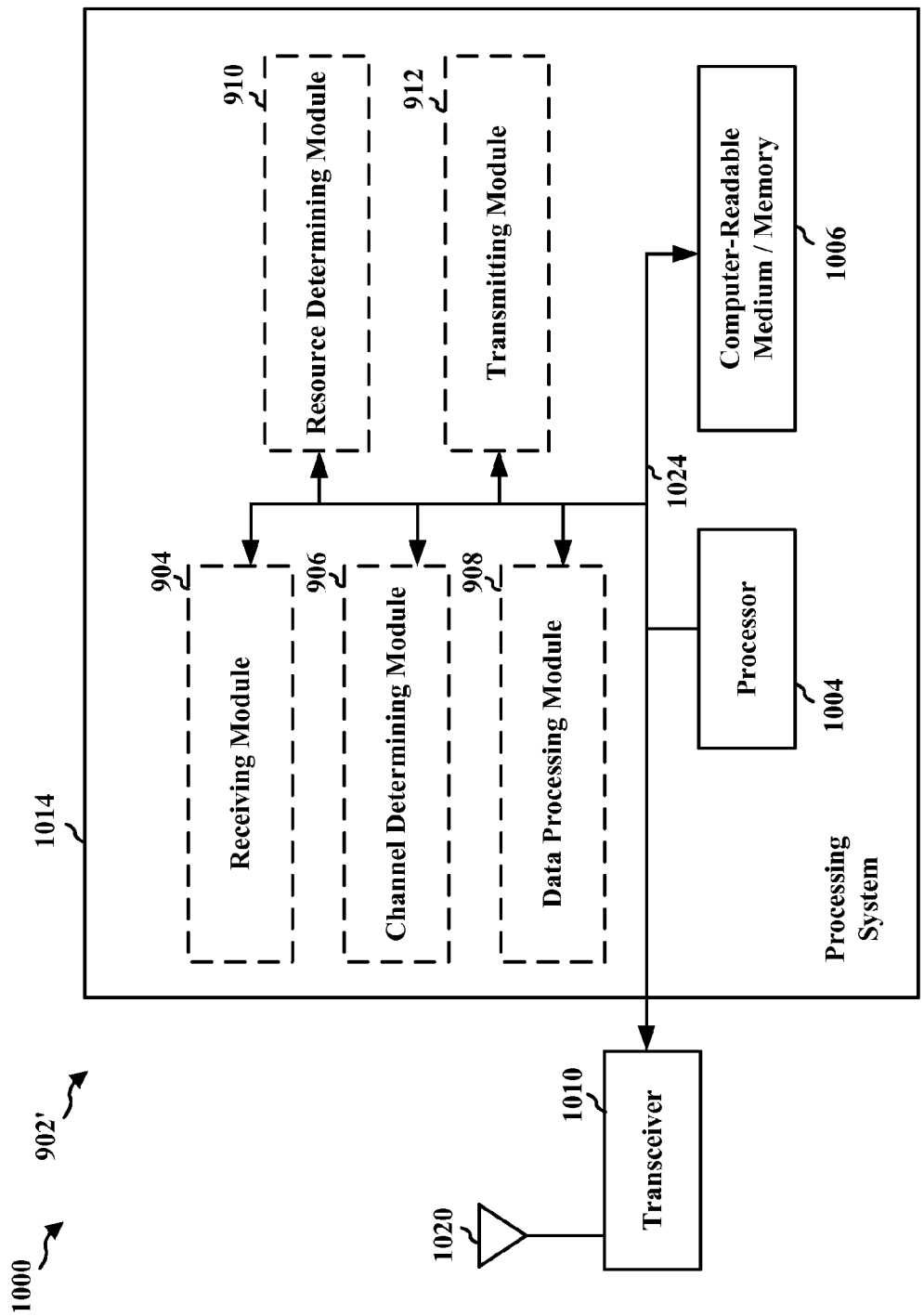
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, 910, 912, and the computer-readable medium/ memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the receiving module 904. In addition, the transceiver 1010 receives information from the processing system 1014, specifically the transmitting module 912, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system further includes at least one of the modules 904, 906, 908, 910, 912. The modules may be software modules running in the processor 1004, resident/stored in the computer readable medium/memory 1006, one or more hardware modules coupled to the processor 1004, or some combination thereof. The processing system 1014 may be a component of the base station 310 and may include the memory 376 and/or at least one of the TX processor 316, the RX processor 370, and the controller/processor 375.

In one configuration, the apparatus 902/902' for wireless communication includes means for determining a first set of channels for communicating with an apparatus, wherein each channel in the first set is determined by performing beam training with the apparatus, means for determining a second set of channels from the first set, wherein the channels of the second set have a channel condition greater than a threshold, means for communicating data via the second set, wherein a channel of the second set on which the data is communicated is based on the channel condition of at least one channel of the second set, means for dividing the data to be communicated among the channels of the second set based on the monitored channel condition of the at least one channel of the second set, means for transmitting, to the apparatus, the resource grant for communicating the data from the apparatus.

The aforementioned means may be one or more of the aforementioned modules of the apparatus 902 and/or the processing system 1014 of the apparatus 902' configured to perform the functions recited by the aforementioned means. As described supra, the processing system 1014 may include the TX Processor 316, the RX Processor 370, and the controller/ processor 375. As such, in one configuration, the aforementioned means may be the TX Processor 316, the RX Processor 370, and the controller/processor 375 configured to perform the functions recited by the aforementioned means.

Figure 11:
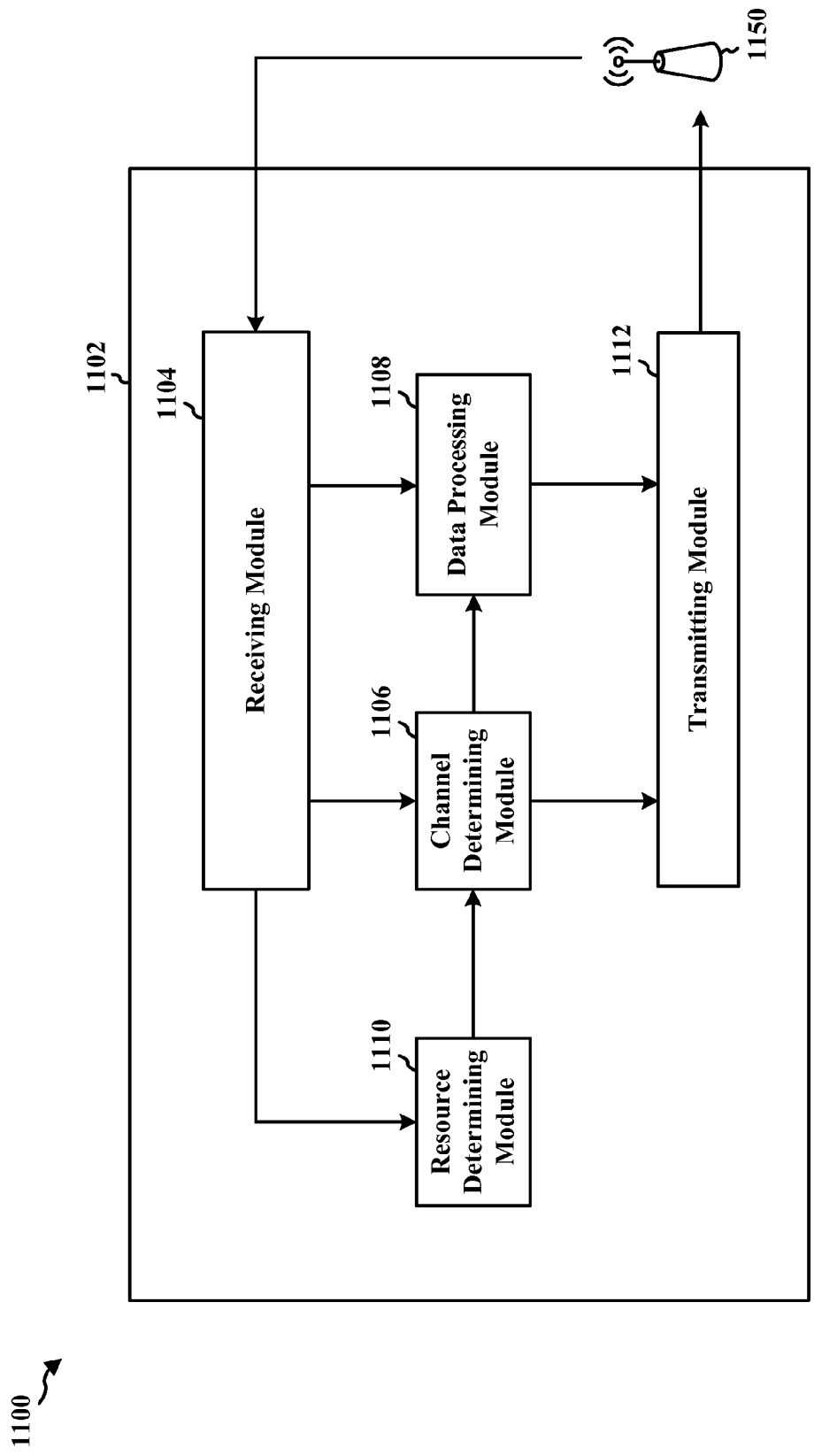
FIG. 11 is a data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a UE (e.g., UE 502). The apparatus includes a receiving module 1104, a channel determining module 1106, a data processing module 1108, a resource determining module 1110, and a transmitting module 1112.

The channel determining module 1106 determines a first set of channels for communicating with a base station 1150 (e.g., CP 502). Each channel in the first set may be determined by performing beam training with the base station 1150.

The channel determining module 1106 determines a second set of channels from the first set. The channels of the second set may have a channel condition greater than a threshold.

The data processing module 1108 communicates data to the base station 1150 via the second set. A channel of the second set on which the data is communicated may be based on the channel condition of at least one channel of the second set. Moreover, the communication of data may include transmitting (via the transmitting module 1112) data to and/or receiving (via the receiving module 1104) data from the base station 1150.

In an aspect, when the apparatus 1102 is configured to receive data from the base station 1150 in the downlink, the channel determining module 1106 may determine the second set of channels by first monitoring the channel condition of each channel of the first set based on receiving from the base station 1150 at least one pilot signal on one or more channels of the first set. Thereafter, the channel determining module 1106 determines the second set to include the one or more channels of the first set having a monitored channel condition greater than the threshold. Accordingly, prior to communicating the data, the data processing module 1108 divides communication of the data (e.g., reception of the data) among the channels of the second set based on the monitored channel condition of at least one channel of the second set. Additionally or alternatively, prior to the data processing module 1108 dividing the data communication, the channel determining module 1106 may transmit to the base station 1150 an acknowledgment (ACK)/negative acknowledgment (NACK) signal on the one or more channels included in the second set in response to the at least one pilot signal.

In another aspect, when the apparatus 1102 is configured to transmit data to the base station 1150 in the uplink, the resource determining module 1110 may receive (via the receiving module 1104) from the base station 1150 a resource grant for communicating the data to the base station 1150. Accordingly, the channel determining module 1106 may determine the second set of channels based on the resource grant provided from the resource determining module 1110. For example, the channel determining module 1106 may determine the second set to include the channels of the first set corresponding to the resource grant. Accordingly, prior to communicating the data, the data processing module 1108 may divide communication of the data (e.g., transmission of the data) among the channels of the second set based on the resource grant.

The apparatus may include additional modules that perform each of the steps of the algorithm in the aforementioned flow charts of FIG. 8. As such, each step in the aforementioned flow chart of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
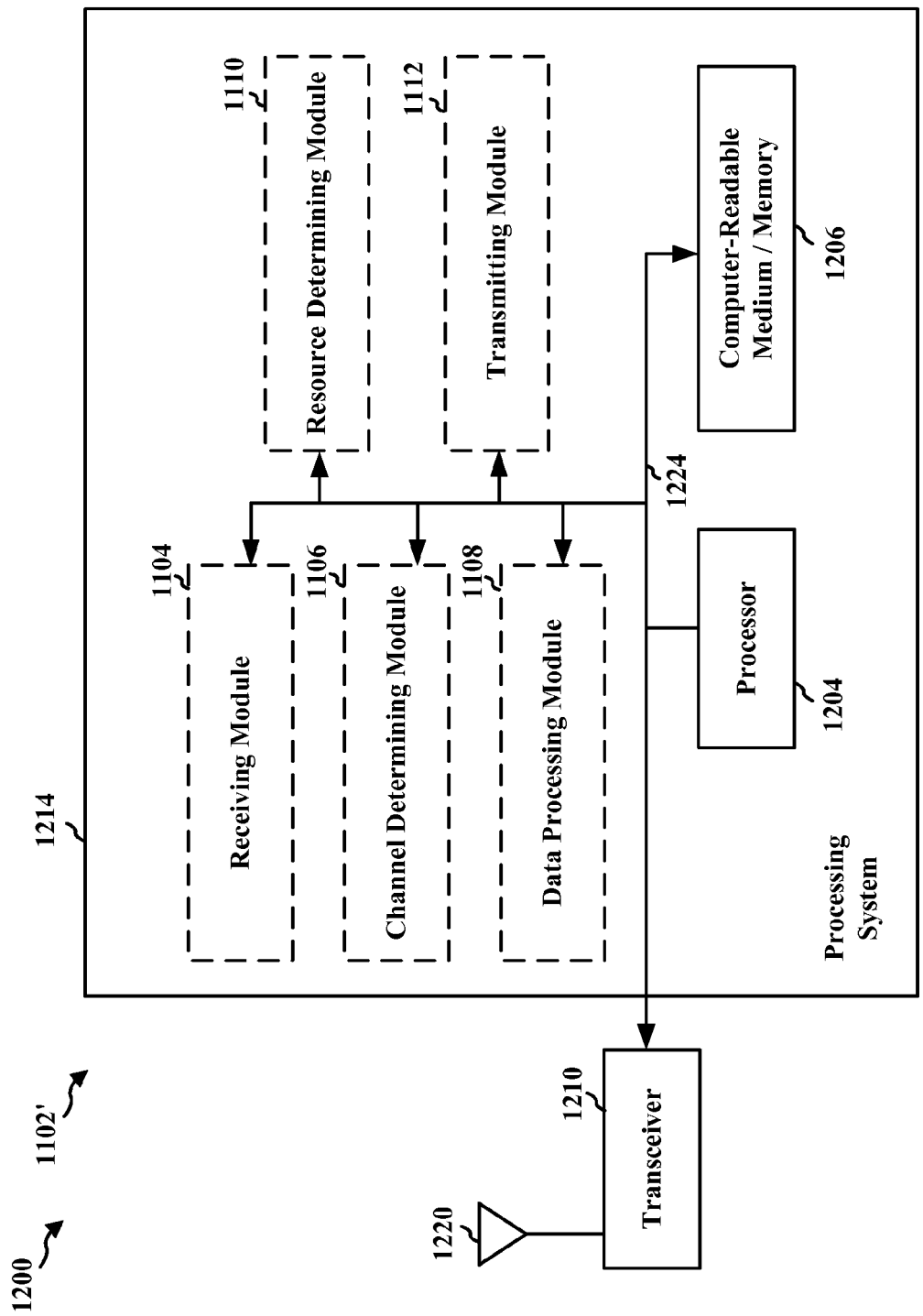
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, 1112 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the receiving module 1104. In addition, the transceiver 1210 receives information from the processing system 1214, specifically the transmitting module 1112, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system further includes at least one of the modules 1104, 1106, 1108, 1110, and 1112. The modules may be software modules running in the processor 1204, resident/stored in the computer readable medium/memory 1206, one or more hardware modules coupled to the processor 1204, or some combination thereof. The processing system 1214 may be a component of the UE 350 and may include the memory 360 and/or at least one of the TX processor 368, the RX processor 356, and the controller/processor 359.

In one configuration, the apparatus 1102/1102' for wireless communication includes means for determining a first set of channels for communicating with an apparatus, wherein each channel in the first set is determined by performing beam training with the apparatus, means for determining a second set of channels from the first set, wherein the channels of the second set have a channel condition greater than a threshold, means for communicating data via the second set, wherein a channel of the second set on which the data is communicated is based on the channel condition of at least one channel of the second set, means for transmitting, to the apparatus, an acknowledgment (ACK)/negative acknowledgment (NACK) signal on the one or more channels included in the second set in response to the at least one pilot signal, and means for dividing the data communication among the channels of the second set based on the monitored channel condition of the at least one channel of the second set.

The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   determining a first set of channels for communicating with an apparatus, wherein each channel in the first set is determined by performing beam training with the apparatus;
   determining a second set of channels from the first set, wherein the channels of the second set have a channel condition greater than a threshold; and
   communicating data via the second set, wherein a channel of the second set on which the data is communicated is based on the channel condition of at least one channel of the second set.

2. The method of claim 1, wherein the determining the second set of channels comprises:
   transmitting, to the apparatus, at least one pilot signal on each channel of the first set;
   monitoring the channel condition of each channel of the first set based on receiving an acknowledgment (ACK)/negative acknowledgment (NACK) signal on one or more channels of the first set in response to the at least one pilot signal; and
   determining the second set to include the channels of the first set having a monitored channel condition greater than the threshold.

3. The method of claim 2, further comprising:
   dividing the data to be communicated among the channels of the second set based on the monitored channel condition of the at least one channel of the second set.

4. The method of claim 2, wherein the determining the second set of channels further comprises:
   adjusting a number of pilot signals transmitted on each channel of the second set based on the monitored channel condition of the at least one channel of the second set.

5. The method of claim 1, wherein the determining the second set of channels comprises:
   monitoring the channel condition of each channel of the first set;
   determining a resource grant for communicating the data based on the monitored channel condition of each channel of the first set; and
   determining the second set to include the channels of the first set corresponding to the determined resource grant.

6. The method of claim 5, further comprising:
   transmitting, to the apparatus, the resource grant for communicating the data from the apparatus.

7. The method of claim 1, wherein the determining the second set of channels comprises:
   monitoring the channel condition of each channel of the first set based on receiving, from the apparatus, at least one pilot signal on one or more channels of the first set; and
   determining the second set to include the one or more channels of the first set having a monitored channel condition greater than the threshold.

8. The method of claim 7, further comprising:
   transmitting, to the apparatus, an acknowledgment (ACK)/negative acknowledgment (NACK) signal on the one or more channels included in the second set in response to the at least one pilot signal.

9. The method of claim 7, further comprising:
   dividing the data communication among the channels of the second set based on the monitored channel condition of the at least one channel of the second set.

10. The method of claim 1, wherein the determining the second set of channels comprises:
    receiving, from the apparatus, a resource grant for communicating the data to the apparatus; and
    determining the second set to include the channels of the first set corresponding to the resource grant.

11. An apparatus for wireless communication, comprising:
    means for determining a first set of channels for communicating with an apparatus, wherein each channel in the first set is determined by performing beam training with the apparatus;
    means for determining a second set of channels from the first set, wherein the channels of the second set have a channel condition greater than a threshold; and
    means for communicating data via the second set, wherein a channel of the second set on which the data is communicated is based on the channel condition of at least one channel of the second set.

12. The apparatus of claim 11, wherein the means for determining the second set of channels is configured to:
    transmit, to the apparatus, at least one pilot signal on each channel of the first set;
    monitor the channel condition of each channel of the first set based on receiving an acknowledgment (ACK)/negative acknowledgment (NACK) signal on one or more channels of the first set in response to the at least one pilot signal; and determine the second set to include the channels of the first set having a monitored channel condition greater than the threshold.

13. The apparatus of claim 12, further comprising:
means for dividing the data to be communicated among the channels of the second set based on the monitored channel condition of the at least one channel of the second set.

14. The apparatus of claim 12, wherein the means for determining the second set of channels is further configured to:
adjust a number of pilot signals transmitted on each channel of the second set based on the monitored channel condition of the at least one channel of the second set.

15. The apparatus of claim 11, wherein the means for determining the second set of channels is configured to:
monitor the channel condition of each channel of the first set;
determine a resource grant for communicating the data based on the monitored channel condition of each channel of the first set; and
determine the second set to include the channels of the first set corresponding to the determined resource grant.

16. The apparatus of claim 15, further comprising:
means for transmitting, to the apparatus, the resource grant for communicating the data from the apparatus.

17. The apparatus of claim 11, wherein the means for determining the second set of channels is configured to:
monitor the channel condition of each channel of the first set based on receiving, from the apparatus, at least one pilot signal on one or more channels of the first set; and
determine the second set to include the one or more channels of the first set having a monitored channel condition greater than the threshold.

18. The apparatus of claim 17, further comprising:
means for transmitting, to the apparatus, an acknowledgment (ACK)/negative acknowledgment (NACK) signal on the one or more channels included in the second set in response to the at least one pilot signal.

19. The apparatus of claim 17, further comprising:
means for dividing the data communication among the channels of the second set based on the monitored channel condition of the at least one channel of the second set.

20. The apparatus of claim 11, wherein the means for determining the second set of channels is configured to:
receive, from the apparatus, a resource grant for communicating the data to the apparatus; and
determine the second set to include the channels of the first set corresponding to the resource grant.

21. An apparatus for wireless communication, comprising:
a memory; and
at least one processor coupled to the memory and configured to:
determine a first set of channels for communicating with an apparatus, wherein each channel in the first set is determined by performing beam training with the apparatus;
determine a second set of channels from the first set, wherein the channels of the second set have a channel condition greater than a threshold; and
communicate data via the second set, wherein a channel of the second set on which the data is communicated is based on the channel condition of at least one channel of the second set.

22. The apparatus of claim 21, wherein the at least one processor is configured to determine the second set of channels by:
transmitting, to the apparatus, at least one pilot signal on each channel of the first set;
monitoring the channel condition of each channel of the first set based on receiving an acknowledgment (ACK)/negative acknowledgment (NACK) signal on one or more channels of the first set in response to the at least one pilot signal; and
determining the second set to include the channels of the first set having a monitored channel condition greater than the threshold.

23. The apparatus of claim 22, wherein the at least one processor is further configured to:
divide the data to be communicated among the channels of the second set based on the monitored channel condition of the at least one channel of the second set.

24. The apparatus of claim 22, wherein the at least one processor is further configured to determine the second set of channels by:
adjusting a number of pilot signals transmitted on each channel of the second set based on the monitored channel condition of the at least one channel of the second set.

25. The apparatus of claim 21, wherein the at least one processor is configured to determine the second set of channels by:
monitoring the channel condition of each channel of the first set;
determining a resource grant for communicating the data based on the monitored channel condition of each channel of the first set; and
determining the second set to include the channels of the first set corresponding to the determined resource grant.

26. The apparatus of claim 25, wherein the at least one processor is further configured to:
transmitting, to the apparatus, the resource grant for communicating the data from the apparatus.

27. The apparatus of claim 21, wherein the at least one processor is configured to determine the second set of channels by:
monitoring the channel condition of each channel of the first set based on receiving, from the apparatus, at least one pilot signal on one or more channels of the first set; and
determining the second set to include the one or more channels of the first set having a monitored channel condition greater than the threshold.

28. The apparatus of claim 27, wherein the at least one processor is further configured to:
transmit, to the apparatus, an acknowledgment (ACK)/negative acknowledgment (NACK) signal on the one or more channels included in the second set in response to the at least one pilot signal; and
divide the data communication among the channels of the second set based on the monitored channel condition of the at least one channel of the second set.

29. The apparatus of claim 21, wherein the at least one processor is configured to determine the second set of channels by:
receiving, from the apparatus, a resource grant for communicating the data to the apparatus; and
determining the second set to include the channels of the first set corresponding to the resource grant.

30. A non-transitory computer-readable medium storing computer-executable code, comprising code to:
determine a first set of channels for communicating with an apparatus, wherein each channel in the first set is determined by performing beam training with the apparatus;

determine a second set of channels from the first set, wherein the channels of the second set have a channel condition greater than a threshold; and communicate data via the second set, wherein a channel of the second set on which the data is communicated is based on the channel condition of at least one channel of the second set.

* * * * *